L. W. HAYNES.
AUTOMOBILE HEADLIGHT.
APPLICATION FILED DEC. 17, 1917.
1,275,421.
Patented Aug. 13, 1918.
2 SHEETS—SHEET 2.
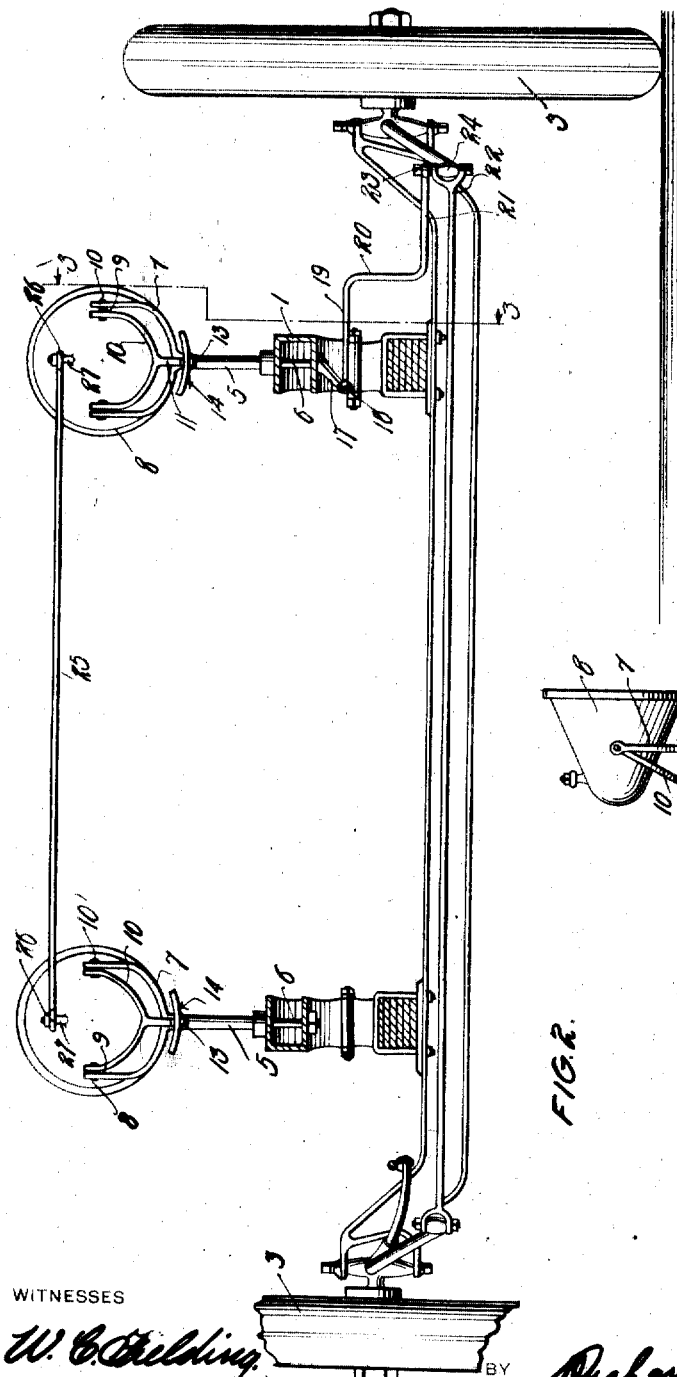
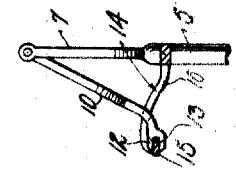
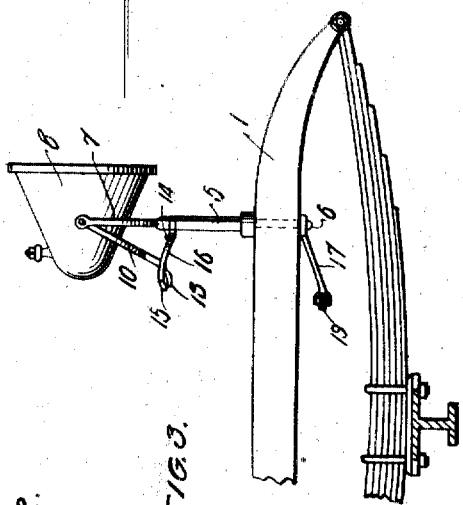
WITNESSES
INVENTOR
Louis W. Haynes
ATTORNEY

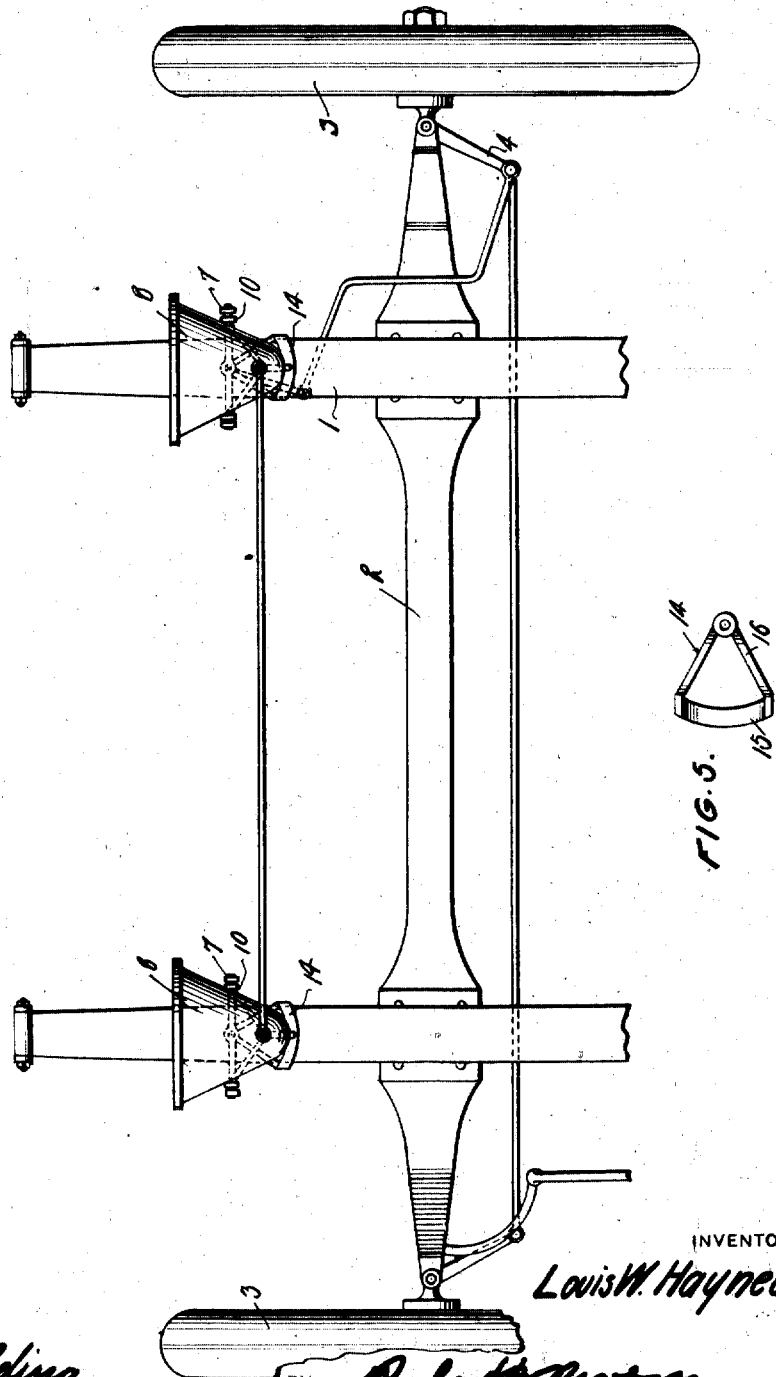

UNITED STATES PATENT OFFICE.

LOUIS W. HAYNES, OF GRAND RAPIDS, MICHIGAN.

AUTOMOBILE-HEADLIGHT.

1,275,421.

Specification of Letters Patent.  Patented Aug. 13, 1918.

Application filed December 17, 1917. Serial No. 207,602.

*To all whom it may concern:*

Be it known that I, LOUIS W. HAYNES, a citizen of the United States, residing at Grand Rapids, in the county of Kent and State of Michigan, have invented certain new and useful Improvements in Automobile-Headlights, of which the following is a specification.

This invention relates to movable head lights for vehicles and has for its object the production of a simple and efficient means for automatically swinging the lamps in the direction of travel of the automobile supporting the same.

Another object of the present invention is the production of a simple and efficient means for tilting the lamp downwardly as the same are swung with the steering wheels of a vehicle.

With these and other objects in view this invention consists of certain novel constructions, combinations and arrangements of parts as will be hereinafter fully described and claimed.

In the drawings:—

Figure 1 is a top plan view of the frame showing the lamps carried thereby,

Fig. 2 is a rear elevation of the lamps and turning mechanism therefor, the supporting frame being shown in section, Fig. 3 is a section taken on line 3—3 of Fig. 2, Fig. 4 is a side elevation of one of the lamp supporting standards, the tilting guide being shown in section, Fig. 5 is a top plan view of the guiding member for tilting the lamp.

By referring to the drawings, it will be seen that 1 designates the frame of the automobile or vehicle, the front end of which is supported upon the front axle 2. The front axle 2 is supported by means of the usual front wheels 3 which wheels are steered or turned by means of the steering mechanism indicated by the numeral 4.

A lamp supporting sleeve 5 is carried upon each side of the frame 1 and a lamp operating standard or supporting standard 6 is journaled within this sleeve portion 5 and extends through the frame 1 as shown clearly in Fig. 2 of the drawings. The upper end of the lamp supporting standard 6 is provided with a lamp supporting yoke 7 upon which is carried the lamp 8. It should be understood that one or more lamps may be supported upon the frame without departing from the spirit of the invention, and it is thought necessary to only describe one of the lamps and the operating means therefor specifically. Each lamp 8 is provided with a pair of lugs 9 formed upon the rear face thereof to which lugs are secured the guiding yoke 10, this guiding yoke 10 being fixed upon the lugs 9, the lugs having projecting portions 10' extending through the yoke 7 and being loosely mounted thereon, for the purpose of permitting the lamp 8 to freely swing upon the yoke 7 as the guiding yoke 10 is shifted.

The guiding yoke 10 is provided with a depending leg 11 which leg is provided with a laterally extending foot 12 having a bifurcated portion 13 formed therein. A tilting bracket 14 is carried by each sleeve 5 and each tilting bracket comprises a curved or arc shaped guiding yoke or plate 15, the ends of this plate being curved upwardly and being supported upon the converging arms 16, which arms 16 are connected in any suitable or desired means to the sleeve 5. These arms 16 may, if so desired, be formed integral with the sleeve 5, such as is shown in Fig. 4 of the drawings.

One of the lamp standards 6 is provided with an operating arm 17 upon the lower end thereof, and this arm 17 is connected by means of a ball and socket joint 18 to the laterally extending end 19 of the operating arm 20. This operating arm 20 is provided with an oppositely extending finger 21 which is secured to the steering mechanism 22 of the usual construction employed for steering the wheels 3. A suitable oil cap 23 is carried by the oppositely extending finger 21 as shown in Fig. 2 for the purpose of lubricating the joint 24.

Where two lamps are employed, as is usual upon motor vehicles, the opposite lamps are connected by means of a connecting rod 25 which is provided with suitable eyes 26 for fitting over the lugs 27 carried by the respective lamps 8.

From the foregoing description and by considering the drawings, it will be seen that as the front wheels 3 are turned, the lamps 8 will also be swung in the direction in which the wheels 3 are turned and in this manner, causing the lamps 8 to illuminate the path of travel of the vehicle supporting the same. As the lamps 8 are turned the shoe 12 of the tilting bracket or guiding yoke 10 will slide upwardly toward the end of the guiding rib 15 and cause the rays of light to be thrown downwardly due to the fact that the tilting bracket or guiding yoke will be raised at its rear end and since the lugs 9 are fixed upon the yoke 10, the lamps 8 will be tilted downwardly. By means of the device illustrated, it will be seen that the rays of light from the lamps will be concentrated upon the ground directly in front of the machine or automobile thereby efficiently lighting the road and at the same time preventing the driver of an approaching machine from being blinded by the sudden flash of light from the lamps 8. It should be understood that the lamps will be tilted downwardly at each time the same are rotated for causing the rays of light to be discharged in the path of travel of the vehicle.

By considering the official drawings, and the above description, it will be seen that a very simple and efficient structure has been produced for the purpose of turning the lamps of a motor vehicle, which may be very cheaply and easily attached to an automobile of any type.

It should be of course understood that certain obvious detail mechanical changes may be made in the present device without departing from the spirit of the invention, so long as these changes fall within the scope of the appended claims.

What is claimed is:—

1. A headlight comprising a lamp, a supporting standard, means for turning said lamp, a tilting bracket provided with a guiding rib having upwardly curved ends, supporting arms supporting said guiding rib and holding the same in spaced relation with respect to said supporting standard, a guiding yoke carried by said lamp, and a bifurcated foot carried by said yoke and fitting over said guiding rib for tilting said lamp as said foot travels over said guiding rib.

2. A headlight comprising a lamp, a supporting standard, means for turning said lamp, a tilting bracket provided with a guiding rib having upwardly curved ends, supporting arms supporting said guiding rib and holding the same in spaced relation with respect to said supporting standard, a guiding yoke carried by said lamp, and means carried by said yoke and engaging said guiding rib and held against accidental displacement therefrom for tilting said lamps as said means travel over said guiding rib.

3. A headlight comprising a lamp, a supporting standard, means for turning said lamp, a tilting bracket supported adjacent said lamp and provided with a guiding rib, a guiding yoke carried by said lamp, and means carried by said yoke and engaging said guiding rib and held against accidental displacement therefrom for tilting said lamp as said lamp is rotated.

In testimony whereof I affix my signature in presence of two witnesses.

LOUIS W. HAYNES.

Witnesses:
CHAS. F. HEXT,
THOS. S. MACLENNON.